United States Patent Office 3,379,683
Patented Apr. 23, 1968

3,379,683
POLYURETHANES PREPARED FROM
m-XYLYLENEDIAMINE
Max Howard Booth, Waynesboro, Va., assignor to E. I. du Pont de Nemours and Company, Wilmington, Del., a corporation of Delaware
No Drawing. Continuation-in-part of application Ser. No. 273,558, Apr. 17, 1963. This application Apr. 13, 1964, Ser. No. 359,458
4 Claims. (Cl. 260—47)

This application is a continuation-in-part of my copending application Ser. No. 273,558, filed Apr. 17, 1963 and now abandoned.

This invention relates to new polymer compositions and more particularly to linear segmented copolymers of the spandex type which contain m-xylylenediamino radicals.

Numerous elastomeric materials prepared from segmented copolymers are known in the art. While these materials possess many desirable physical properties, improvements in such properties as solubility in solvents for preparing spinning solutions, lower set and higher power on repeated extension at the most frequently used working elongations are needed. In addition, improvement in whiteness retention while retaining the more desirable physical properties is also desired.

It is, therefore, an object of this invention to provide segmented elastomeric copolymers which have improved resistance to discoloration while retaining their desirable physical properties. Another object is to provide filaments of segmented copolymers which exhibit the properties of lower set and higher power at the lower elongations. A further object is to provide segmented elastomeric copolymers which have improved solubility in spinning solvents wherein the solutions are stable over extended periods of time.

These and other objects are accomplished by providing segmented elastomeric copolymers which are the reaction products of a difunctional hydroxyl-terminated polymer having a molecular weight between about 1000 and about 3500 and a molar excess of an organic diisocyanate to form an isocyanate-terminated polymer which is thereafter chain-extended by reaction with at least a stoichiometric amount of m-xylylenediamine. These segmented elastomeric copolymers have an essentially linear structure in which the repeating structural unit is represented by the following formula:

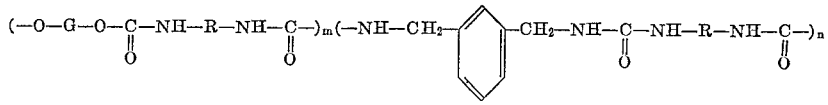

wherein $m$ and $n$ are positive integers; G is a long-chain polymeric radical free from substituents reactive with an isocyanate and having a molecular weight above about 950; and R is a divalent organic radical defined hereinafter.

As previously indicated the copolymers are obtained by reacting m-xylylenediamine with a difunctional isocyanate-terminated polymeric material which will be referred to herein as a "macrointermediate." The macrointermediate should have a molecular weight of at least 1500, preferably between 1500 and 3000.

If the components providing G and R are properly selected, one obtains elastic copolymers which may be shaped into filaments having good elastic properties without the need for cross-linking or further curing. For the production of such products, the hydroxyl-terminated polymer HO—G—OH from which G is derived should melt below about 60–70° C., preferably below 50° C. R is selected from the group consisting of p,p'-methylenediphenyl, p,p'-isopropylidenediphenyl, p,p'-oxydiphenyl, p,p'-thiodiphenyl, and homologous radicals containing methyl substituents on the rings. The preferred product of this invention contains from about 65% to about 95% by weight of residues having the structure

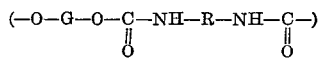

While the products of this invention have the general structure which is typical of the spandex polymers, it is indeed surprising to find that the presence of the m-xylylene-diamino radical in the urea segment provides a significant improvement in the properties of power and set, particularly within the elongation limits normally used in garment preparation and experienced during wearing of the garment. Even more surprising is the discovery that these properties far exceed those obtained when p-xylylenediamine is used as a chain extender.

In the preparation of the copolymers of this invention, the starting materials HO—G—OH are polymeric glycols having a molecular weight of at least 1000. These materials include the hydroxyl-terminated polyethers, polyesters, copolyetheresters, polyacetals, and N-alkylated polyurethanes, all of which are well known in the art. Mixtures of these polymeric glycols may be used. From a standpoint of commercial availability, the preferred polymeric glycols for this invention are the polyether glycols, polyester glycols, and mixtures thereof.

The main group of suitable polyethers is the polyalkylene ethers, such as polyethylene glycol, polypropylene ether glycol, polytetramethylene ether glycol, polyhexamethylene ether glycol, etc. Mixtures of monomeric glycols may be used to prepare copolyethers. Some of the alkylene radicals in the polyether may be replaced by arylene or divalent cycloaliphatic radicals. The preferred polyether glycol is polytetramethylene ether glycol.

The polyester glycols may be prepared by reacting dibasic acids, esters, or acid halides with a molar excess of monomeric glycol, as is well known in the art. Suitable glycols are the polymethylene glycols, such as hexamethylene, pentamethylene, decamethylene glycols; substituted polymethylene glycols, such as 2-ethyl-2-methylpropanediol; and cyclic glycols, such as cyclohexanediol. These glycols may be reacted with the proper molar ratio of aliphatic, cycloaliphatic, or aromatic acids or their ester-forming derivatives to produce low-molecular-weight polymers. Suitable acids for preparing polyesters and/or copolyesters are carbonic, adipic, sebacic, terephthalic, and hexahydroterephthalic acids. Mixtures of glycols and/or mixtures of acids or acid derivatives to form copolyesters may also be employed. The alkyl- and halogensubstituted derivatives of these acids may also be used. An ether-containing glycol, such as triethylene glycol, may be used to produce polyetherester glycols. Polyester glycols derived from lactones may also be used.

In all cases, the polymeric glycol is prepared so that it has terminal hydroxyl groups and a molecular weight of at least 1000. As explained above, the molecular weight of the polymeric glycol should not be greater than about 3500, and the melting point should preferably be less than 50° C.

The polymeric glycol is reacted with a molar excess of a suitable organic diisocyanate in order to prepare the isocyanate-terminated "macrointermediate" for subsequent reaction with m-xylylenediamine in the practice of this invention. The useful diisocyanates are p,p'-methylenediphenyl diisocyanate, p,p'-isopropylidenediphenyl diisocyanate, p,p'-oxydiphenyl diisocyanate, p,p'-thiodiphenyl diisocyanate, and the homologs of these diisocyanates which contain methyl substituents in the rings, for example, 4,4'-methylenebis(3-methylphenyl) diisocyanate, 4,4'-methylenebis(2,5-dimethylphenyl) diisocyanate, and 4,4'-methylenebis(2,6-dimethylphenyl) diisocyanate. The use of diisocyanates other than those included in the above definition is preferably to be avoided, but small amounts, i.e., up to about 10 mol percent, of other diisocyanates well known in the polyurethane art are permitted. For example, tolylene diisocyanate, m-xylylene diisocyanate, hexamethylene diisocyanate, p-phenylene diisocyanate, or p-xylylene diisocyanate may be present in amounts up to about 10 mol percent of the total diisocyanate used. Of course, the diisocyanates should be free of substituents which are reactive with an isocyanate group.

As hereinbefore indicated, a molar excess of diisocyanate is used to prepare the isocyanate-terminated "macrointermediate." The most desirable products of this invention are obtained when two mols of diisocyanate are used for reaction with one mol of polymeric glycol. However, the invention may be readily practiced so long as the molar ratio of organic diisocyanate to polymeric glycol is kept between about 1.7 and about 2.2. As is well known in the art, regulation of this ratio is a means of controlling the length of the polyurea segment relative to the length of the segment containing the polymeric glycol in the segmented elastomeric copolymer.

It is to be understood that in the formation of the products of this invention, mixtures of reagents may be used. Consequently, the radicals G and R appearing in the formulas hereinabove do not necessarily represent identical radicals throughout the formula for a given polymer. For example, mixtures of diisocyanates may be used in the reaction with the polymeric glycols.

The copolymers of this invention may be prepared by known polymerization techniques. They are preferably made by solution-polymerization. According to this technique, the reactants, i.e., the isocyanate-terminated macrointermediate and m-xylylenediamine are dissolved in separate portions of a suitable solvent which also serves as a solvent for the resulting copolymer. The two solutions are then mixed and stirred for a period of time ranging from a few minutes up to several hours at a temperature between about 0° C. and about 100° C. During this time, the viscosity increases and the polymer may be recovered and purified according to known methods. Suitable solvents for the polymerization reaction include N,N-dimethylformamide, N,N - dimethylacetamide, N - methylpyrrolidone, hexamethylphosphoramide, dimethyl sulfoxide, and tetramethylene sulfone. Alternatively, the polymers of this invention may be prepared by other polymerization techniques, as described in U.S. 2,957,852.

As is well known in the art, small amounts of low-molecular-weight compounds having end groups capable of reacting with amine, for example, acid chloride, may be present during the reaction with the m-xylylenediamine in the practice of this invention. Also, low-molecular-weight compounds with end-groups containing active hydrogen atoms, for example, glycols, may be added in small amounts together with the m-xylylenediamine. As used herein, "small amounts" means amounts up to about 10 mol percent of the total low-molecular-weight compound having end-groups reactive with amine or containing active hydrogen atoms, as the case may be.

Other diamino compounds may be used in minor amounts together with the m-xylylenediamine. "Minor amounts" means amounts not greater than 50 mol percent of the total chain-extenders used. In other words, at least 50 mol percent of chain-extender is m-xylylenediamine. The suitable diamino compounds include the hydrazines and di-primary and di-secondary organic diamines, for example, ethylenediamine, piperazine, 1,3-cyclohexylenediamine, 1,4-diaminopiperazine, and hydrazine. When a plurality of chain-extenders is used, the compounds may be reacted with the macrointermediate as a mixture, or they may be reacted sequentially in any order, as desired. In order to control the molecular weight of the segmented copolymer, a small amount of a chain terminator, e.g., diethylamine, may also be included.

The term "substantially linear" as used herein is not intended to exclude polymers which have branches extending out from the main polymer chain. Cross-linked products may be obtained by using reactants with a functionality of more than two, but this is generally less satisfactory for most applications since an appreciable degree of cross-linking interferes with the shaping of such products. The products of this invention may be cross-linked by conventional methods, e.g., by heating with excess diisocyanate, but it is found that this step is not necessary to achieve useful products. In order to avoid cross-linking the copolymers of this invention, therefore, it is advisable to use a stoichiometric amount, or even a slight excess, e.g., up to 10 mol percent, of m-xylylene diamine when carrying out the reaction with the isocyanate-terminated macrointermediate.

One advantage of preparing the polymers of this invention in a solvent is that the solution may be used directly for the formation of films, filaments, coatings, etc. The films or coatings may be formed by pouring or otherwise applying the solution to form a thin film by evaporation of the solvent. Filaments may be obtained from these solutions by conventional procedures, including dry-spinning and wet-spinning. Shaping and polymerization may also be combined into a single step by the process described in U.S. Re. 24,689 and generally known as chemical-spinning. The properties of the films and filaments prepared from some of the copolymers are improved by a cold-drawing operation, for example, at draw ratios from about 2× to about 10×.

The copolymers of this invention most useful for film and filament applications are those having an intrinsic viscosity above 0.5. Intrinsic viscosity refers to the limiting value, as the concentration approaches zero, of the expression $$\frac{n-n_o}{n_o c}$$

in which $n$ is the viscosity of a dilute solution of the copolymer, $n_o$ is the viscosity of the solvent (hexamethylphosphoramide) in the same units and at the same temperature, and $c$ is the concentration in grams of the copolymer per 100 ml. of solution.

This invention will be further illustrated, but is not intended to be limited, by the following examples in which parts and percentages are by weight unless otherwise specified. The terms $P_{50}$, $P_{100}$, and $P_{200}$ refer to the fifth-cycle unload values of stress ("power") at the elongations indicated by the respective subscripts, after cycling as follows: yarn is cycled five times between zero and 300% extension at a constant rate of elongation, i.e., 300% per minute for Examples I, II and III and 800% per minute for Examples IV, V and VI. The sample is held at the maximum extension for one minute after the first and fifth cycles to permit stress decay. Stress, on unloading from this last cycle, is then measured. At the end of the fifth cycle, the length of the yarn is measured after being allowed to recover for one minute, and is used in the determination of "set" described hereinafter. The length of yarn is measured between two marks placed on the yarn before testing. This technique is used to avoid error caused by slippage of the yarn sample in the clamps of the testing instrument.

The properties measured as described in the preceding paragraph are significant in evaluating an elastomeric yarn for use in the bare or uncovered state. The cycling limit of 300% elongation represents the normal maximum extension to which a yarn would be subjected during garment preparation and wear. The effective power at 50%, 100% and 200% from fifth cycle of the unload curve simulates the elastomer elongations which would be encountered during wear of fabric. Since the wearer elongates these fibers only to 50%–100% under use, the importance of the values of $P_{50}$ and $P_{100}$ is obvious. The greater these values for the elastic fiber, the more "holding power" the finished garment will exhibit.

The term "set" refers to the increase in length of the sample as a result of the 5-cycle test described above and is expressed as percent of original length. A low value of set is desirable because the entire stress/strain curve is lowered as set increases. This results in lower power-values at low elongations. The terms "elongation" and "tenacity" refer, respectively, to the percent elongation at break and the stress measured in grams per denier at the break.

Example I

Polytetramethylene ether glycol having a molecular weight of about 2000 (3080 parts) is mixed with 750 parts of p,p'-methylenediphenyl diisocyanate and heated for one hour at 80° C. to produce an isocyanate-terminated macrointermediate which contains 3.30% NCO. This product is then dissolved in 2570 parts of dry N,N-dimethylacetamide. 1525 parts of the above mixture is added with stirring to a solution of 48 parts of m-xylylenediamine and 1.6 parts of diethylamine in 2550 parts of dimethylacetamide at ambient temperature. The viscous solution of segmented copolymer obtained contains 24% solids and has a viscosity of 1200 poises. The segmented copolymer has an inherent viscosity of 1.26.

The viscose solution of the segmented copolymer obtained as described above is dry-spun in the usual way to produce elastic filaments. The filaments possess the following as-spun properties: denier—66; set—16%; $P_{50}$—0.12 g.p.d. (.108 g./tex); $P_{100}$—.036 g.p.d. (3.24 g./tex); and $P_{200}$—.073 g.p.d. (.657 g./tex).

In addition to the preparation of filaments the above solution is cast into a film which exhibits the following properties: tenacity—0.69 g.p.d. (6.21 g./tex); elongation—495%; $P_{50}$—.012 g.p.d. (.108 g./tex); and $P_{100}$—.032 g.p.d. (.288 g./tex).

A sample of the solution of the segmented copolymer is permitted to stand at room temperature. The sample does not gel after standing for more than 30 days. No appreciable change in solution viscosity is noted after standing for 7 days.

Example II

Polytetramethylene ether glycol having a molecular weight of about 1000 is reacted with p,p'-methylenediphenyl diisocyanate in a 1:2 molar ratio to provide an isocyanate-terminated macrointermediate and is found on analysis to contain 5.45% NCO. It is dissolved in sufficient dimethyl-acetamide to provide a 60% solution, of which 5000 parts are added with stirring to a mixture of 258 parts of m-xylylenediamine and 0.94 part of diethylamine in 7200 parts of dimethylacetamide at room temperature. The resulting solution of segmented copolymer contains 27.1% solids and has a viscosity of 350 poises. The copolymer has an inherent viscosity of 1.0. It is dry-spun to produce elastic filaments which possess the following properties: denier—443; tenacity—0.84 g.p.d. (7.6 g./tex); elongation—410%; $P_{100}$—.014 g.p.d. (.126 g./tex); $P_{200}$—.069 g.p.d. (.621 g./tex).

Example III

A mixture of 735 parts of ethylene glycol and 1167 parts of adipic acid is heated under nitrogen for 48 hours at 120° C. at atmospheric pressure, and then for 48 hours at the same temperature under vacuum. There is obtained a polyethylene adipate melting at 48–50° C. and having a molecular weight of approximately 2000.

A mixture of 50 parts of the above-described polyester glycol and 12.5 parts of p,p'-methylenediphenyl diisocyanate is stirred and heated for 30 minutes at 80° C. Heat is removed and 140 parts of dry dimethylacetamide is added to form a solution, which is then cooled to 10° C. A mixture of 3.558 parts of m-xylylenediamine, 0.17 part of diethylamine and 6.67 parts of dimethylacetamide is added rapidly. The viscous solution of segmented copolymer obtained contains 31.9% solids and has a viscosity of 275 poises. The segmented copolymer has an inherent viscosity of 1.04.

A viscous solution of the segmented copolymer obtained as described above is dry-spun in the usual way to produce elastic filaments. The filaments possess the following as-spun properties: tenacity—0.75 g.p.d. (6.75 g./tex); elongation—596%; set 30%; $P_{50}$—.004 g.p.d. (0.36 g./tex); $P_{100}$—.011 g.p.d. (.099 g./tex).

A sample of the solution is permitted to stand at room temperature. The sample does not gel and shows no appreciable change in solution viscosity for a period of several weeks.

Example IV

A mixture of trimethylene glycol and adipic acid is heated under nitrogen for 6 hours at 140–190° C. at atmospheric pressure, and then for 5.5 hours at 220° C. under vacuum. There is obtained a poly(trimethylene adipate) melting at 30–32° C. and having a molecular weight of approximately 1500.

A mixture of 2000 parts of the above polyester glycol and 662 parts of p,p'-methylenediphenyl diisocyanate is stirred and heated at 80° C. for 80 minutes. Heat is then removed and 6800 parts of dry dimethylacetamide is added to form a solution, which is then cooled to 50° C. A mixture of 174 parts of m-xylylenediamine, 3.1 parts of diethylamine and 348 parts of dimethylacetamide is added rapidly with stirring. The resulting solution contains about 27.4% solids and has a viscosity of 770 poises at 29° C. It is dry-spun to provide elastic filaments. The filaments possess the following properties after being immersed in boiling water for one hour in a relaxed condition: denier—32; tenacity—0.63 g.p.d. (5.67 g./tex); elongation—375%; set—25%; $P_{50}$—.004 g.p.d. (.036 g./tex); $P_{100}$—.023 g.p.d. (.207 g./tex).

Example V

An isocyanate-terminated macrointermediate is prepared as described in Example I. A solution is formed by dissolving 38 parts of the macrointermediate (.015 mol) in 38 parts of dry dimethylacetamide. The solution is added at 25° C. with stirring to a solution containing m-xylylenediamine, a second diamino compound as indicated below, and .08 part of diethylamine in 114 parts of dimethylacetamide. The two diamino chain-extenders are present in such amounts as to provide a total of .015 mol of chain-extender and in such ratios that the second diamino compound constitutes 20 mol percent and 40 mol percent, respectively, of the total chain-extender.

The viscous solution of segmented polyurethane so obtained contains about 20% of polymeric solids. It is cast into a film having a thickness of about 20 mils. The film is dried for 16 hours at 70° C. and is cut into thin strips which display the following properties after immersion in boiling water for 30 minutes:

| Other Diamino Compound | Molar ratio, Percent | Tenacity | | Elongation (Percent) | $P_{50}$ | | $P_{100}$ | | Set (Percent) |
|---|---|---|---|---|---|---|---|---|---|
| | | G.p.d. | G./tex | | G.p.d. | G./tex | G.p.d. | G./tex | |
| Ethylenediamine | 20 | .35 | 3.15 | 470 | .014 | .126 | .030 | .270 | 18 |
| Do | 40 | .37 | 3.33 | 475 | .013 | .117 | .031 | .277 | 18 |
| 1,3-cyclohexylenediamine | 20 | .59 | 5.31 | 520 | .015 | .135 | .031 | .277 | 16 |
| 1,3-cyclohexylenediamine | 40 | .46 | 4.14 | 500 | .015 | .135 | .029 | .261 | 15 |
| ,4-diaminopiperazine | 20 | .47 | 4.23 | 515 | .012 | .108 | .030 | .270 | 16 |
| 1,4-diaminopiperazine | 40 | .48 | 4.32 | 520 | .013 | .117 | .026 | .234 | 15 |

Example VI

Polytetramethylene ether glycol (60 parts) having a molecular weight of about 1000 and 56 parts of poly(trimethylene adipate) having a molecular weight of about 930 are mixed with 8.2 parts of 2,4-tolylene diisocyanate and heated at 90° C. until reaction is complete. To this polyester/ether glycol containing urethane linkages is added 30 parts of p,p'-methylenediphenyl diisocyanate. The mixture is heated at 80–90° C. for one hour. To a stirred solution of 25 parts of the product in 95 parts of dry N,N-dimethylacetamide at 25° C. is added a solution of 1.06 parts of m-xylylenediamine and 0.039 part of diethylamine in 6.4 parts of dimethylacetamide.

The viscous solution of segmented polyurethane so obtained contains about 20% solids and as a viscosity of 775 poises. The product has an inherent viscosity of 1.72. It is cast into a film having a thickness of 4 mils, which is processed as in Example V and displays the following properties: tenacity—0.35 g.p.d. (3.15 g./tex); elongation—536%; set—23%; $P_{100}$—.025 g.p.d. (.225 g./tex); $P_{200}$—.066 g.p.d (.594 g./tex).

As may be seen from the examples, segmented copolymers derived from m-xylylenediamine display excellent solution stability. This property affords technical advantage in the operation of a commercial process for the spinning of elastic fibers. Obviously, solutions having unreasonably short times to gelation have limited utility in a continuous process for spinning spandex fibers.

Moreover, although changes in copolymer composition leading to improved solubility and stability to gelation are not new in this art, such changes generally result in poorer elastic properties for the segmented copolymer. Thus, improved solubility and stability to gelation are conventionally attained at the sacrifice of copolymer physical properties, and vice versa. It is indeed surprising that chain extension with m-xylylenediamine affords the result of sharply increasing solubility of the segmented copolymer while significantly improving the important elastic properties of power and set at the same time. In addition, the improvement is achieved without impairing the color of the polymers and filaments prepared therefrom. The initial color of the solutions of the polymers of the examples was good and was substantially retained upon exposure in fume-fading and ultraviolet exposure tests.

The products of this invention are particularly useful in the field of elastic filaments. The polymers are also useful in the formation of films, coatings, and other shaped articles. Since three elastomers from m-xylylenediamine display a low set on cycling, they afford a correspondingly higher power at low elongations than do elastomers displaying a higher set. This property is of great importance in certain end uses for elastic filaments, such as in the construction of bare power-net fabrics. Sheerer and lighter weight fabrics with better "holding power" in foundation garments can thus be made from these elastomers without resorting to the technique of covering normally used for rubber threads. However, even in the field of covered yarn, a low set during cycling affords increased effective power available for a given covered elastic yarn.

In addition to the advantages of low set during cycling and higher power at low elongations, the products of this invention have another useful property. After being spun from a very hot dry-spinning cell, they may be wound up under high tension to form a metastable fiber which will undergo high shrinkage on subsequent relaxation in hot water. This property is valuable in preparing stretch fabrics or fabrics of high bulk, as will be apparent to those skilled in that art. The shrinkage obtained during the relaxing step, such as during a wet finishing operation on the fabric, may be varied to some extent by the choice of spinning and windup conditions.

I claim:

1. A segmented polymer of fiber-forming molecular weight comprising a plurality of intralinear structural units having the formula

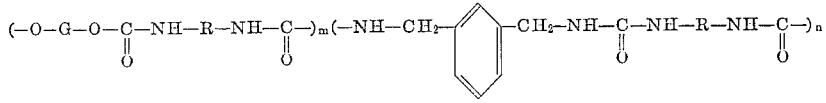

wherein $m$ and $n$ are positive integers; G is a long-chain polymeric radical free from substituents reactive with an isocyanate and having a molecular weight above about 950 and which in its hydroxyl-terminated form,

HO—G—OH has a melting point below about 70° C.; and R is a divalent radical containing an aromatic ring and selected from the group consisting of p,p'-methylenediphenyl, p,p'-isopropylidenediphenyl, p,p'-oxydiphenyl, p,p'-thiodiphenyl, and the foregoing radicals having methyl substituents on the rings.

2. The polymer of claim 1 wherein said radical G is selected from the group consisting of long-chain polyethers and polyesters which in their hydroxyl-terminated form, HO—G—OH, have a melting point below about 70° C. and a molecular weight of 1000 to 3500.

3. The polymer of claim 1 in the form of a filament.

4. A segmented polymer in accordance with claim 1 in which 65 and 95 weight percent thereof is provided by residues having the structure

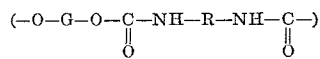

References Cited

UNITED STATES PATENTS

| 2,929,800 | 3/1960 | Hill | 260—77.5 |
| 2,929,804 | 3/1960 | Steuber | 260—77.5 |
| 2,962,470 | 11/1960 | Jung | 260—75 |
| 2,999,839 | 9/1961 | Arvidson et al. | 260—77.5 |
| 3,097,192 | 8/1963 | Schilit. | |

OTHER REFERENCES

Sampson et al.: "Rubber Age," vol. 89, pp. 263–8 (1961).

Netherlands published application No. 64—4154 (October 1964).

Netherlands published application No. 64—9667 (February 1967).

DONALD E. CZAJA, *Primary Examiner.*

LEON J. BERCOVITZ, *Examiner.*

J. KLOCKO, F. McKELVEY, *Assistant Examiners.*